United States Patent
Norton et al.

(10) Patent No.: US 7,305,708 B2
(45) Date of Patent: Dec. 4, 2007

(54) METHODS AND SYSTEMS FOR INTRUSION DETECTION

(75) Inventors: Marc A. Norton, Eldersburg, MD (US); Daniel J. Roelker, Arlington, VA (US)

(73) Assignee: Sourcefire, Inc., Columbia, MD (US)

( * ) Notice: Subject to any disclaimer, the term of this patent is extended or adjusted under 35 U.S.C. 154(b) by 709 days.

(21) Appl. No.: 10/793,887

(22) Filed: Mar. 8, 2004

(65) Prior Publication Data

US 2004/0205360 A1    Oct. 14, 2004

Related U.S. Application Data

(60) Provisional application No. 60/462,387, filed on Apr. 14, 2003.

(51) Int. Cl.
*H04L 9/00*     (2006.01)
*G08B 23/00*    (2006.01)
*G06F 15/18*    (2006.01)

(52) U.S. Cl. .................... 726/23; 726/22; 713/151

(58) Field of Classification Search ............... 713/151; 726/23, 22
See application file for complete search history.

(56) References Cited

U.S. PATENT DOCUMENTS 5,796,942 A * 8/1998 Esbensen ............... 726/13
6,219,786 B1 * 4/2001 Cunningham et al. ...... 713/152
6,321,338 B1 * 11/2001 Porras et al. .............. 726/25
6,324,656 B1 * 11/2001 Gleichauf et al. .......... 714/37
6,499,107 B1 * 12/2002 Gleichauf et al. .......... 726/23

OTHER PUBLICATIONS

"SNORT—Lightweight Intrusion Detection For Networks," Martin Roesch, USENIX, Proceedings of LISA '99 Systems Administration Conference, Nov. 12, 1999.*
"Writing SNORT Rules," Martin Roesch, 1999.*

* cited by examiner

*Primary Examiner*—Nasser Moazzami
*Assistant Examiner*—Oscar A Louie
(74) *Attorney, Agent, or Firm*—Posz Law Group, PLC

(57) ABSTRACT

Performance of an intrusion detection system is enhanced with the addition of rule optimization, set-based rule inspection, and protocol flow analysis. During rule optimization, rule sets are created and selected in such a way that for every incoming packet only a single rule set has to be searched. Set-based rule inspection divides rules into content and non-content type rules. Only search patterns of content type rules are initially compared to a packet. Rules containing matched search patterns are validated with a parameterized search against the packet. Matches are recorded as events. Non-content rules are searched against a packet using a parameterized search. These matches are also recorded as an event. At least one event is selected per packet for logging. Protocol flow analysis determines the direction of flow of network traffic. Based on the direction of flow and the protocol, portions of packets can be eliminated from rule inspection.

31 Claims, 11 Drawing Sheets

METHODS AND SYSTEMS FOR INTRUSION DETECTION

CROSS-REFERENCE TO RELATED APPLICATION

This application claims the benefit of U.S. Provisional Patent Application Ser. No. 60/462,387, filed Apr. 14, 2003, which is herein incorporated by reference in its entirety.

BACKGROUND OF THE INVENTION

1. Field of the Invention

Embodiments of the present invention relate to systems and methods for improving the speed of intrusion detection systems. More particularly, embodiments of the present invention relate to systems and methods for optimizing rules, improving work flow, and enhancing multi-rule inspection in intrusion detection systems that monitor network traffic.

2. Background Information

Computers and computer networks connecting such computers are vital components of modern society. Unfortunately, these computers and computer networks are susceptible to attacks from internal and external hostile sources. These attacks include but are not limited to viruses, worms, zombies, and Denial Of Service (DOS) attacks.

Any unauthorized use of or attack on a computer or computer network, whether successful or not, is called an intrusion. One method of combating such intrusions is to detect them before they occur or as they are occurring. This allows system and network administrators to identify the intrusion and prevent or ameliorate an attack. This can be done by analyzing all of the network traffic on a computer network, or analyzing all of the network traffic to and from a given computer.

Software and hardware designed to do this analysis are called Intrusion Detection Systems (IDSs).

IDSs typically analyze network traffic at the packet level. FIG. 1 is a schematic diagram showing the components of an exemplary conventional IDS. In IDS 100, packet acquisition system 120 gets or sniffs a packet from network traffic 110 and decodes it. Decoding includes but is not limited to deciphering protocol information and placing the packet in a human readable format. The acquired and decoded information is sent by packet acquisition system 120 to preprocessor 130. Preprocessor 130 prepares the packet for detection engine 140. This preparation or preprocessing includes but is not limited to defragmenting packets, decoding Hyper Text Transfer Protocol (HTTP) Universal Resource Identifiers (URIs), or re-assembly of Transmission Control Protocol (TCP) streams. The preprocessed packet is sent from preprocessor 130 to detection engine 140.

Packets are typically composed of layers of different network protocols. Each network protocol consists of a header portion and content portion. The header portion includes but is not limited to parameters specifically used by the protocol such as source and destination addresses and port information. The content information includes but is not limited to the actual data being sent. Since network protocols are layered, the content portion of one lower level network protocol will contain both the header and content information of a higher level network protocol.

Detection engine 140 searches a preprocessed packet for items in the packet that may constitute an intrusion. These items include but are not limited to specific parameters in the header portion of a network protocol, binary patterns in the content portion of a network protocol, or the combination of specific parameters in the header portion and binary patterns in the content portion of a network protocol. These items are hard coded in some IDSs. In other IDSs, these items are generated from rules that are provided to the IDS as input. In a rules-based IDS, as shown in FIG. 1, rules 150 are loaded into detection engine 140 during initialization or during executation of the IDS. A rules-based IDS provides greater flexibility. As new types of intrusions are discovered, they are added to the system as a new rule, and recompilation of the IDS is not required.

When detection engine 140 detects an intrusion, it passes the packet information to logging system 160. A rules-based detection engine 140 also sends any logging information provided in the rule that was matched. Logging system 160 includes but is not limited to storing the packet information in a file, storing any logging information from a matched rule in a file, or sending an alert message to another device or computer.

Because the number of different types of intrusions is steadily increasing with the increasing amount of network traffic across computer networks, rules-based IDSs are preferred. These types of IDSs allow new intrusion detection rules to be added quickly and easily. Unfortunately, however, increasing the number of rules is not without a cost. In conventional rules-based IDSs, as the number of the rules increases, the amount of time required to process each packet increases proportionally. As a result, as the speed of the network traffic is increased, a conventional rules-based IDS containing a large number of rules will not be able to process every packet.

In view of the foregoing, it can be appreciated that a substantial need exists for systems and methods that can advantageously improve the processing speed of rule-based IDSs as the speed of network traffic reaches and exceeds one gigabit per second.

BRIEF SUMMARY OF THE INVENTION

Embodiments of the present invention relate to systems and methods for improving the processing speed of IDSs. One embodiment of the present invention is a method of optimizing the rules in a rules-based IDS. This exemplary method involves creating groupings of rules from a list of IDS rules. These groupings or rule sets are created during initialization of the IDS. In another embodiment of this method, they are updated while the IDS is executing, when a new rule is added to the IDS. Rules are selected for a rule set based on the network protocol parameters they contain. Some rule sets are combined if a user identifies them as rule sets capable of producing a unique conflict.

This method also involves selecting at least one rule set for each packet during execution of the IDS by comparing packet parameters to rule set parameters. In another embodiment of this method, only one rule set is selected for each packet. In another embodiment of this method, exactly two rule sets are selected for each packet.

Another embodiment of the present invention is a method for resolving conflicts between rule sets when two or more rule sets are selected for a packet. The first step of this exemplary method is the creation of a list of defined unique conflict rule sets. Each defined unique conflict rule set on the list is created by combining at least two unique rule sets. The rule sets that are combined are defined by the IDS user. The list of defined unique conflict rule sets is created during IDS initialization and after rule set initialization.

When a packet is found during IDS processing that contains parameters that match more than one rule set, the packet parameters are first compared to the rule sets on the list of defined unique conflict rule sets. If a match is found with a defined unique conflict rule set, then that rule set is inspected. If a match is not found, all of the rule sets that originally matched the parameters of the packet are selected for inspection. In another embodiment of this method, each of the rule sets is inspected until a rule in a rule set matches the packet. If this occurs, any remaining rule sets are not inspected. In another embodiment of this method, one of the rule sets that originally matched the parameters of the packet is randomly selected for inspection and is inspected. The other rule sets matching the parameters of the packet are not inspected.

Another embodiment of the present invention is an IDS that includes but is not limited to a packet acquisition system, a preprocessor, a detection engine, a logging system, and a rule optimizer. The packet acquisition system obtains packets and decodes them. The preprocessor receives decoded packet information from the packet acquisition system. It preprocesses this information and provides it to the detection engine. The detection engine searches the preprocessed packet information for intrusions, inspects the packet for intrusions, and sends intrusion information to the logging system. The logging system logs intrusion events in a file or provides alerts to users. The rule optimizer creates a collection of rule sets from the list of intrusion detection rules. It provides the collection of rule sets to the detection engine. The detection engine selects at least one rule set from the collection of rule sets for inspection for each packet that the detection engine processes at run time. In another embodiment of this system, the detection engine selects only one rule set. In another embodiment of this system, the detection engine selects exactly two rule sets.

Another embodiment of the present invention is a method for detecting rule matches during packet processing in an IDS. In this method, each rule is identified as either a content rule or a non-content rule. The search pattern parameter of a content rule is scanned against a packet. The search pattern parameter includes but is not limited to a string defined by the rule content keyword or a string defined by the rule uricontent keyword. The algorithms that are used include but are not limited to a Wu-Manber search algorithm, an Aho-Corasick search algorithm, and a naive set-based Boyer-Moore search algorithm. A match of the search pattern parameter and the packet is added to a list of content match events. The remaining rule parameters of each rule associated with each item on the list of content match events are compared with the packet parameters of the packet. If all of the remaining rule parameters of a content matched rule match the packet parameters, the match is added to a list of intrusion events. Rule parameters of each rule identified as a non-content rule are compared with the packet parameters. If all of the parameters of a non-content rule match the packet parameters, the match is added to the list of intrusion events. One or more intrusion events are selected from the list of intrusion events for each packet for logging purposes.

In another embodiment of this method, search pattern parameters of two or more rules identified as content rules are scanned against a packet in parallel. In another embodiment of this method, the scanning of the search pattern parameter of a content rule against the packet is halted, if the search pattern parameter of the content rule has previously matched the packet. This prevents DOS attacks.

Another embodiment of the present invention is an IDS that implements set-based rule inspection. The IDS includes but is not limited to a packet acquisition system, a preprocessor, a detection engine, and a logging system. The packet acquisition system intercepts a packet transmitted across a computer network and decodes the packet. The preprocessor receives decoded packet information from the packet acquisition system and preprocesses the packet. The detection engine receives preprocessed packet information from the preprocessor and inspects the packet for intrusions using set-based rule inspection. The logging system receives detected intrusion information from the detection engine and stores the intrusion information to a file.

In set-based rule inspection, the detection engine identifies each rule as either a content rule or a non-content rule. It scans a search pattern parameter of a rule identified as a content rule against a packet. It adds a match of the search pattern parameter and the packet to a list of content match events. It compares the remaining rule parameters of each rule associated with each item on the list of content match events with packet parameters of the packet. It adds each match of all the remaining rule parameters with the packet parameters to a list of intrusion events. It compares non-content rule parameters of each rule identified as a non-content rule with the packet parameters. It adds each match of all the non-content rule parameters with the packet parameters to the list of intrusion events. It selects for each packet one or more intrusion events from the list of queued intrusion events for logging.

Another embodiment of the present invention is a method for analyzing data flow in a computer network. A packet transmitted on the computer network is intercepted. A protocol associated with the packet is determined. The protocol includes but is not limited to HTTP. A type of data flow associated with the protocol is determined. The type of data flow includes but is not limited to client-to-server data flow or server-to-client data flow. The packet is then processed in accordance with the determined type of data flow. The determined type of data flow includes but is not limited to HTTP response data traffic and accordingly is not processed.

Another embodiment of the present invention is a method for determining the portions of HTTP data flow in a computer network that should not be processed by an IDS. A packet on the computer network is intercepted. It is determined if a transport protocol of the packet included a TCP portion. It is determined if a source port in a header portion of the TCP portion includes a Web server port, if the transport protocol includes the TCP portion. Determining if the source port includes a Web server port includes but is not limited to determining if the source port is port 80 (port 80 is a standard server port and TCP designation an is not a reference to a figure). It is determined if a destination port of the header portion includes a Web server port, if the source port includes a Web server port. Determining if the destination port includes a Web server port includes but is not limited to determining if the destination port is port 80. The first four bytes of a data portion of the TCP portion are decoded, if the destination port does not include a Web server port. It is determined if the first four bytes identify the data portion as an HTTP response header. If the first four bytes identify the data portion as an HTTP response header the data portion only up to an HTTP maximum response bytes limit is processed and the remainder of the data portion is ignored. The entire data portion is ignored if the first four bytes do not identify the data portion as an HTTP response header.

Another embodiment of the present invention is a method for determining the portions of HTTP data flow in a computer network that should not be processed by an IDS.

Another embodiment of the present invention is an IDS that implements protocol flow analysis. The IDS includes but is not limited to a packet acquisition system, a preprocessor, a detection engine, and a logging system. The packet acquisition system intercepts a packet transmitted across a computer network and decodes the packet. The preprocessor receives decoded packet information from the packet acquisition system and preprocesses the packet. The detection engine receives preprocessed packet information from the preprocessor and inspects the packet for intrusions using set-based rule inspection. The logging system receives detected intrusion information from the detection engine and stores the intrusion information to a file.

In protocol flow analysis, the detection engine determines a protocol associated with the packet, determines a type of data flow associated with the protocol, and processes the packet in accordance with the determined type of data flow.

Another embodiment of the present invention is an IDS that implements rule optimization, set-based rule inspection, and protocol flow control. The IDS includes but is not limited to a packet acquisition system, a preprocessor, a detection engine, and a logging system. The packet acquisition system intercepts a packet transmitted across a computer network and decodes the packet. The preprocessor receives decoded packet information from the packet acquisition system and preprocesses the packet. The detection engine receives preprocessed packet information from the preprocessor and inspects the packet for intrusions using set-based rule inspection. The logging system receives detected intrusion information from the detection engine and stores the intrusion information to a file. The rule optimizer creates a collection of rule sets from the list of intrusion detection rules. It provides the collection of rule sets to the detection engine.

In rule optimization, the detection engine selects at least one rule set from the collection of rule sets for inspection for each packet that the detection engine processes at run time. In another embodiment of this system, the detection engine selects only one rule set. In another embodiment of this system, the detection engine selects exactly two rule sets.

In set-based rule inspection, the detection engine identifies each rule either as a content rule or a non-content rule. It scans a search pattern parameter of a rule identified as a content rule against a packet. It adds a match of the search pattern parameter and the packet to a list of content match events. It compares the remaining rule parameters of each rule associated with each item on the list of content match events with packet parameters of the packet. It adds each match of all the remaining rule parameters with the packet parameters to a list of intrusion events. It compares non-content rule parameters of each rule identified as a non-content rule with the packet parameters. It adds each match of all the non-content rule parameters with the packet parameters to the list of intrusion events. It selects for each packet at least one intrusion event from the list of queued intrusion events for logging.

In protocol flow analysis, the detection engine determines a protocol associated with the packet, determines a type of data flow associated with the protocol, and processes the packet in accordance with the determined type of data flow.

Figure 1:
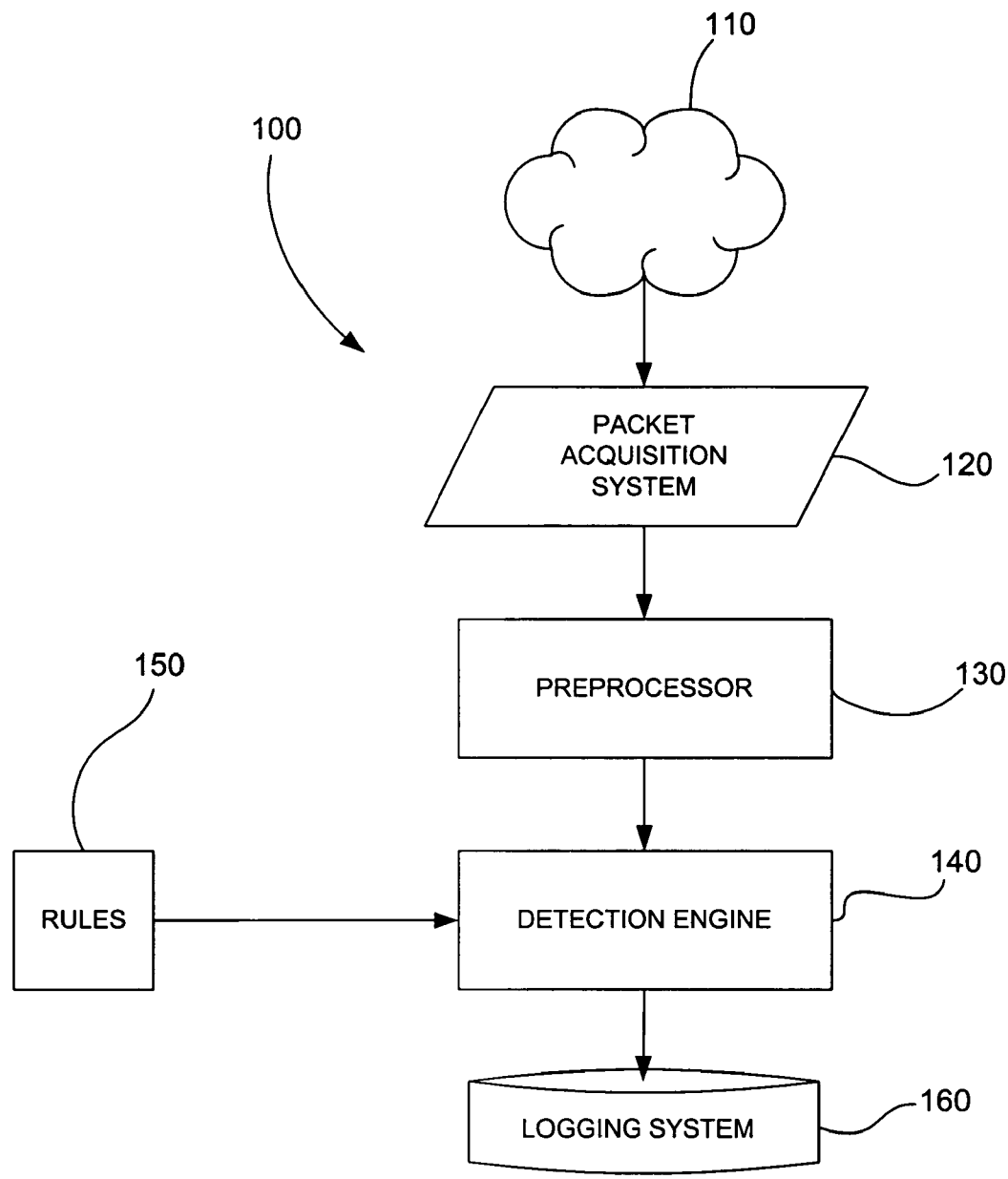
FIG. 1 is a schematic diagram showing the components of an exemplary conventional IDS.

Before one or more embodiments of the invention are described in detail, one skilled in the art will appreciate that the invention is not limited in its application to the details of construction, the arrangements of components, and the arrangement of steps set forth in the following detailed description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

In a conventional rules-based IDS, inspecting rules against network traffic amounts to performing a parameterized search of all the rules. The parameters of the search are the IDS rule options. A good parameterized search will use a search order based on each parameter's relative ability to terminate a useless search quickly or to efficiently narrow the search space for the next parameter search. Parameter ordering is usually determined by some specific knowledge of which parameters provide the quickest elimination, or ensure the most likely chance of success. This information is based on a deeper understanding of the problem being parameterized. An IDS typically uses the understanding of Internet Protocol (IP) protocols to efficiently order the rule parameters.

Rules-based IDSs have also grouped their rules into a collection of rule sets. Rules were placed in rule sets based on a subset of parameters they had in common. As a result, a rule set was selected for inspection by matching the subset of parameters for the rule set with the network traffic. In other words, the selection of the rule set was done by a parameterized search of a smaller number of parameters.

One exemplary IDS created rule sets based on four parameters. These were source IP address, destination IP address, source port range, and destination port range. When a packet was inspected, the IDS used the four parameters of each rule set to decide whether or not to inspect the rules in that rule set or simply move on to the next rule set. If a packet matched the four parameters of a rule set, the rules in that rule set were tested in sequence, and the remaining parameters of each rule were tested in order. After all the rules in a rule set had been tested, the four parameters for the next rule set were searched and the process began again.

In general, this is an efficient method when dealing with a small amount of rules. However, when there are over ten rules in a rule set, this processing method becomes an inefficient way of inspection. The rule inspection slows down due to the fact that rules in a rule set are inspected linearly, meaning that each parameter for every rule is discretely inspected. Another aspect of this parameterized rule processing is that the parameters of all rule sets must be inspected for every packet.

Set-based inspection methodologies are capable of enhancing the processing speed of rule inspection. Parameterized rule processing, however, does not lend itself well to set-based inspection as the number of rules increases significantly. For set-based inspection methodologies to perform efficiently, rule sets need to be optimized such that only one rule set is inspected against each packet. In addition, alternative and more efficient methods of rule inspection are needed.

Rule Optimization

Figure 2:
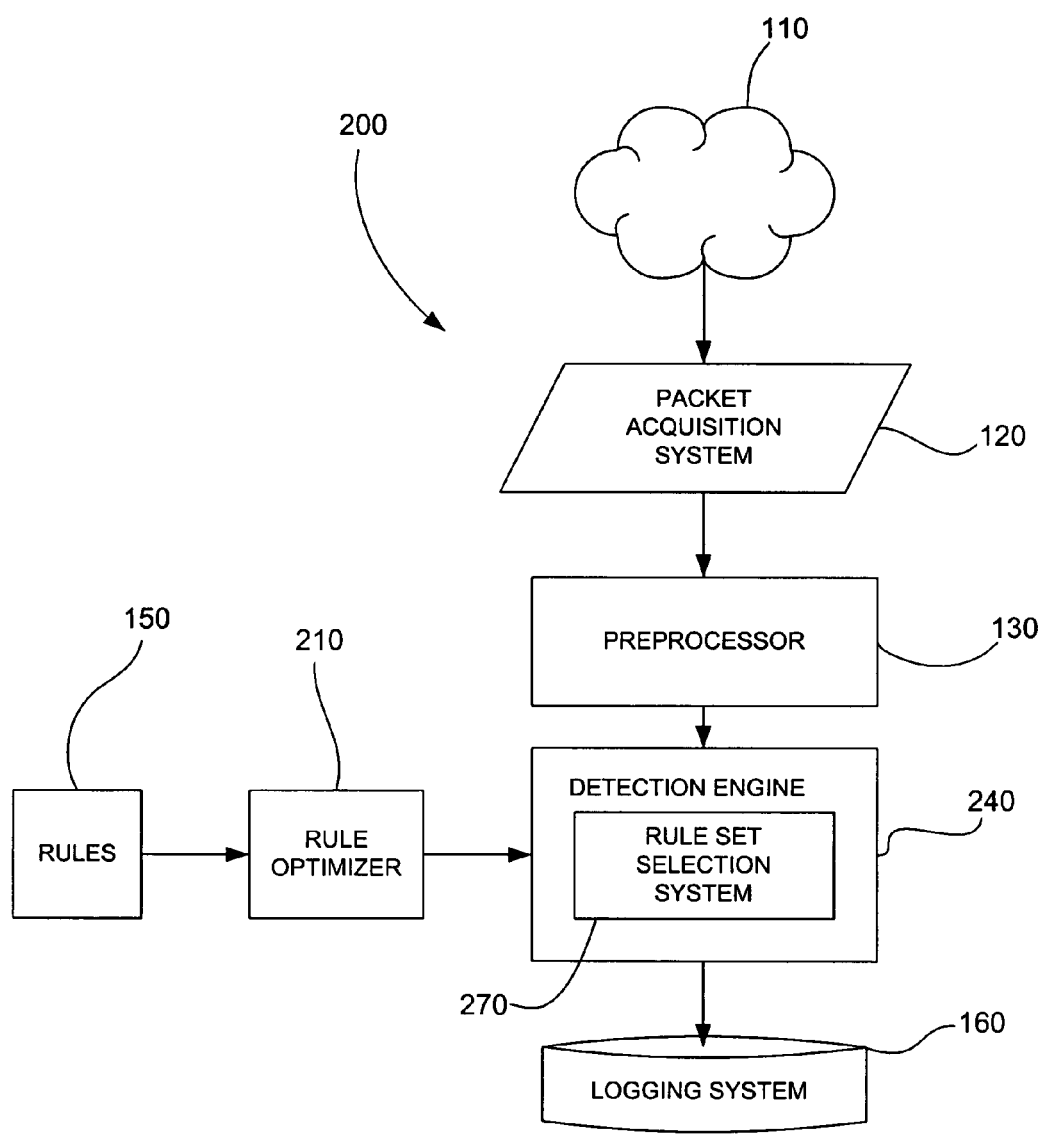
FIG. 2 is a schematic diagram showing how rule optimization is implemented in an IDS in accordance with an embodiment of the present invention.

FIG. 2 is a schematic diagram showing how rule optimization is implemented in an IDS in accordance with an embodiment of the present invention. In FIG. 2 and the following figures, the reference numbers for steps from previous figures are used to signify substantially similar steps. In rule-based IDS 200, rule optimizer 210 accepts rules 150 as input. Rule optimizer 210 provides rule sets to detection engine 240. In order to accomplish this goal, rule optimizer 210 fulfills two requirements. First, it creates the smallest, most efficient rule sets possible. Second, it creates discrete rule sets in such a way that for every incoming packet only a single rule set has to be searched.

Rule optimizer 210 creates these rule sets during initialization by using the most unique IDS rule parameters. In another embodiment rule optimizer 210 updates these rule sets upon addition of a new rule, while detection engine 240 is executing. The chosen rule parameters are different for each transport protocol, because each transport protocol has different parameters that make them unique. For instance, a TCP rule may be unique from other TCP rules based on the source and destination ports, while an Internet Control Message Protocol (ICMP) rule may be unique based on the ICMP type of that rule. Rule optimizer 210 takes all of these unique parameters and forms rule subsets based on them. This gives detection engine 240 much smaller rule sets to inspect. And more importantly, it allows each packet to be classified into one rule subset using the packet's characteristics.

It is important to note that part of rule optimization takes place in detection engine 240. This is because the selection of the rule set depends on matching some of the packet parameters to the rule set parameters. During IDS run time, rule set selection system 270 of detection engine 240 selects a rule set for every packet that is processed. In this sense, rule set selection system 270 is validating only the rules that could match this packet and filtering only the rules that the remainder of detection engine 240 needs to process. Detection engine 240 refines the selected rule set even further by inspecting the content parameters using set-based inspection methodologies.

Rule optimizer 210 divides rules into definable, minimal rule sets that the IDS can access quickly. This is accomplished using unique parameters that are dependent on the network protocol. Exemplary unique properties of ICMP and IP are the ICMP type and the transport protocol identification, respectively. Exemplary unique properties of both TCP and User Datagram Protocol (UDP) are the source and destination ports. Ports are divided into two generic categories. These categories are reserved and non-reserved. This means that most communications between hosts will have one reserved port, usually the server, with the other port being non-reserved, above port 1024 (port 1024 is a TCP port number and is not a reference to a figure) and usually the client. This property allows rule optimizer 210 to use the reserved port as the unique parameter. By using the reserved port, the IDS selects rule sets based on whether the reserved, or unique, port is located in either the source port or the destination port. If the unique port is located in the source port, it usually means that this is traffic from the server. When the unique port is located in the destination port, it usually means that this is traffic from the client.

In TCP and UDP there is two-way communication. This is communication between clients and servers. This means that the IDS sees packets from the client going to the server and packets going from the server to the client. So instead of applying all the rules for both client communications and server communications to a packet, rule optimizer 210 groups rules based on the location of the unique port in either the source port or destination port. This way, client-request rules and server-response rules are both unique rule sets. This prevents the redundancy of client packets being inspected against server-response rules and vice versa.

For example, HTTP client request traffic needs to be inspected against HTTP client request rules, not HTTP server response rules. So when a packet is coming from the HTTP client, which means that "port 80" is in the TCP destination port field, both the source and destination ports are checked for unique ports. Almost always for client HTTP traffic, the source port is not a unique port, because it is above 1024, but the destination port is since it is destined to an HTTP server, which usually resides on port 80 or another defined HTTP server port. So in the case of an HTTP client packet, the rule set with the parameters of "destination port 80" and "source port generic" is selected, and gets inspected by detection engine 240.

ICMP rules use only the ICMP type field for optimizing ICMP rule sets. Rules that do not have a type field are considered generic ICMP rules and are added to every individual rule set, including the generic rule set. For example, an incoming ICMP packet with a type code of "8", echo request, will get inspected against the type code "8" as a parameter. However, if the type code is not unique, it gets inspected against the generic ICMP rule set.

Rule optimizer 210 supports the IP protocol by using the IP transport protocol field. All IP rules that include TCP, UDP, or ICMP are grouped into that particular protocol rule set. But the other protocols that are not supported are grouped into IP rule sets based on the transport protocol field. Rules that contain no protocol field are considered generic IP rules and are added to every IP, TCP, UDP, and ICMP rule set.

In practice, the rule optimizer 210 uses the transport protocol information to create and select efficient rule sets. But rule set selection system 270 of detection engine 240 must select only one rule set per packet. In order for rule set selection system 270 to select only one rule set, it must combine the unique rules for that rule set with the generic rules for the unique rules' transport protocol.

Unique rules are defined by the existence of unique parameters. These unique parameters can be specific information in the transport header or the IP header that the rule refers to. Generic rules do not have any unique parameters to distinguish them from other rules. For example, a rule can be written that says "match this content against all packets." In such a case, the rule parameters are not unique because there is nothing except the content to distinguish this rule from any other rule.

Both unique rules and generic rules must have separate rule sets. By creating unique rule sets and generic rule sets both set selection scenarios are covered. Creating the unique rule sets covers the scenario where a packet matches a unique rule set. And creating a generic rule set covers the scenario where a packet does not match a unique rule set, because the packet must still be inspected against all of the generic rules for that protocol.

In order for this breakdown of unique rules and generic rules to work, the generic rules must be added into all the unique rule sets. Otherwise, two rule sets would be searched for every packet, the unique rule set and the generic rule set. Since a packet that matches a unique rule set could also match a generic rule, these two rule sets get combined at rule optimization. So, rule set selection system 270 selects the combined rule set of unique and generic rules that is based on the packet being inspected.

For some abnormal packets, there is a chance of selecting two rule sets. This case is called a "unique conflict." Unique conflicts can only occur when there are two or more parameters by which rule sets are selected. If both of these parameters are the same or are substantially the same, then there is a unique conflict. Currently, unique conflicts only occur in TCP and UDP.

There are two types of unique conflicts. These types are defined unique conflicts and undefined unique conflicts. Defined unique conflicts are handled by inspecting both of the legitimate unique rule sets combined into one rule set. Undefined unique conflicts are handled in a number of methods, and the method that is used depends on the level of performance that the user requires.

All unique conflicts cannot be defined because the address space is too large, creating too many possible permutations. A rule set would have to be created for each permutation. For example, if there are 1000 unique source port rule sets and 1000 unique destination port rule sets, then there would have to be 1,000,000 unique conflict port rule sets. Considering the memory requirements for a rule set, this becomes impractical. While defined unique conflicts occur naturally, undefined unique conflicts rarely occur, and when they do it is usually a matter of interest.

An example of a legitimate unique conflict is apparent in Domain Name Server (DNS) queries between servers. During this communication both ports will be 53 (port 53 refers to a TCP and is to a reference to a figure). In this case, both sets of rules should be applied to this packet. Legitimate unique conflicts are defined by the protocol definition, and in these cases there is a separate group of rules that contain both client and server rules. This means that all rules that can be applied to a unique conflict are applied in one pass instead of two separate passes. This is the ideal condition for set-based inspection.

When a user defines what she will allow to be unique conflicts, rule optimizer 210 takes both of the unique rule sets and compiles the two groups into one rule set during initialization of the rule sets. By using the compiled rule set, detection engine 240 still only inspects one rule set for a packet, maximizing the inspection performance.

While defined unique conflicts occur naturally, undefined unique conflicts occur rarely. If undefined unique conflicts occur, it is usually because it is some sort of malicious or anomalous event. However, when undefined unique conflicts do occur, an alternate flow of set selection must take place. The reason is because an undefined unique conflict results in two rule sets that must be inspected.

In one embodiment of the present invention, undefined unique conflicts are handled with double inspection. Double inspection is the most basic type of method to handle an undefined unique conflict. Since there are two rule sets for an undefined unique conflict, the double inspection method just inspects both rule sets, approximately doubling the time it takes for inspection to occur. The double inspection method guarantees that all events will be found in a packet, however this method is more prone to DOS attacks by forcing the double inspection with constructed packets that cause undefined unique conflicts.

In another embodiment of the present invention, undefined unique conflicts are handled with first-hit inspection. The first-hit inspection method is similar to the double inspection method in that it inspects both rule sets. The difference is that if an event is generated in the rule set that is first inspected, then the second rule set is never inspected. This approach helps with performance from the double inspection method, if there is a generated event in the first rule set.

In another embodiment of the present invention, undefined unique conflicts are handled with probabilistic inspection. The probabilistic inspection method selects one of the two rule sets randomly. By using this method, it prevents possible DOS attacks due to undefined unique conflicts. But it does not guarantee that, if there are any events in the packet, the events will be found. However, it also protects against the attacker using the knowledge that only one rule set will be selected in an undefined unique conflict by keeping it probable. For example, an attacker could take advantage of a method that picked either the source or destination rule set for undefined unique conflicts. The attacker could use an attack that is in the rule set that is not going to be inspected when causing an undefined unique conflict. By using a probabilistic approach, an attacker needs to role the dice and can never be sure that his attack was detected or not.

A comparison of the three embodiments for handling undefined unique conflicts shows that the double inspection method provides the greatest protection, the first-hit inspection method provides less protection, and the probabilistic method provides the least amount of protection. The first-hit inspection method helps prevent against DOS attacks due to the double inspection method, and also generates an event, if possible, for every undefined unique conflict. However, it does not guarantee against DOS attacks as does the probabilistic method, nor does it guarantee that every event will be found, as does the double inspection method. Of course, the order is reversed, in terms of speed of execution.

Figure 3:
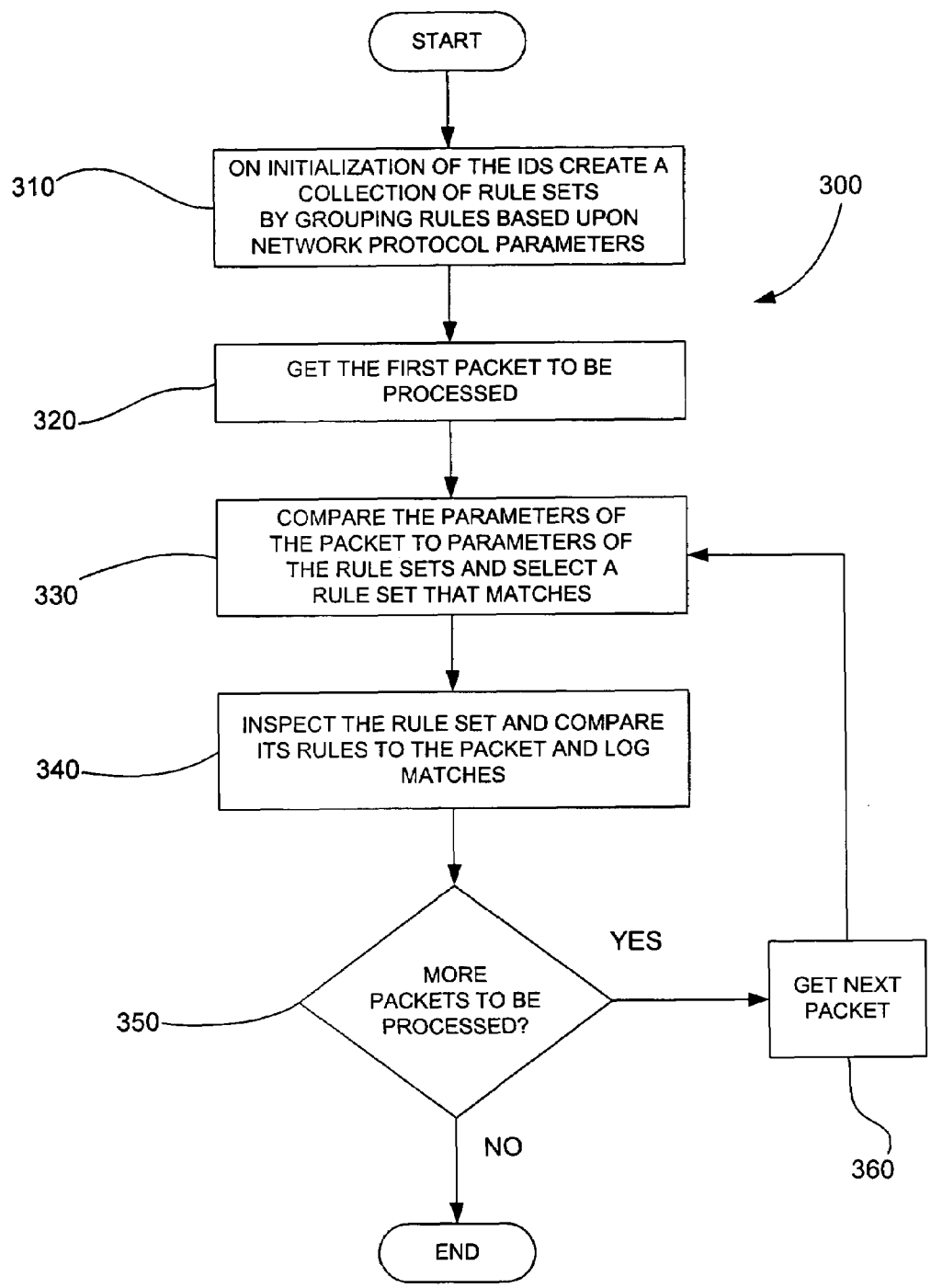
FIG. 3 is a flowchart showing how rule optimization is integrated into the process of selecting rules for a rules-based IDS in accordance with an embodiment of the present invention.

FIG. 3 is a flowchart showing how rule optimization is integrated into the process of selecting rules for a rules-based IDS, in accordance with an embodiment of the present invention.

In step 310 of process 300, a collection of rule sets is created by grouping intrusion detection rules. This grouping preferably occurs each time the IDS is initialized. The rules are grouped based on the network protocol parameters that they contain. The rule sets are then provided as input to the detection engine.

In step 320, the first packet to be processed is obtained by the detection engine.

In step 330, the parameters of the packet are compared by the detection engine to the parameters of the rule sets. When the parameters of the packet match the parameters of a rule set, the rule set is selected for inspection of its rules.

In step 340, the selected rule set is inspected. The parameters of the packet are compared to the parameters of each rule in the rule set. If there is a match, the detection engine sends the information to the logging system.

In step 350, the detection engine checks for more packets to be processed. If there are no more packets, the process ends. If there are more packets, the process moves to step 360.

In step 360, the next packet is obtained by the detection engine. The process returns to step 330 and the comparison of the packet parameters with the parameters of the rule sets is executed again, completing a loop.

Figure 4:
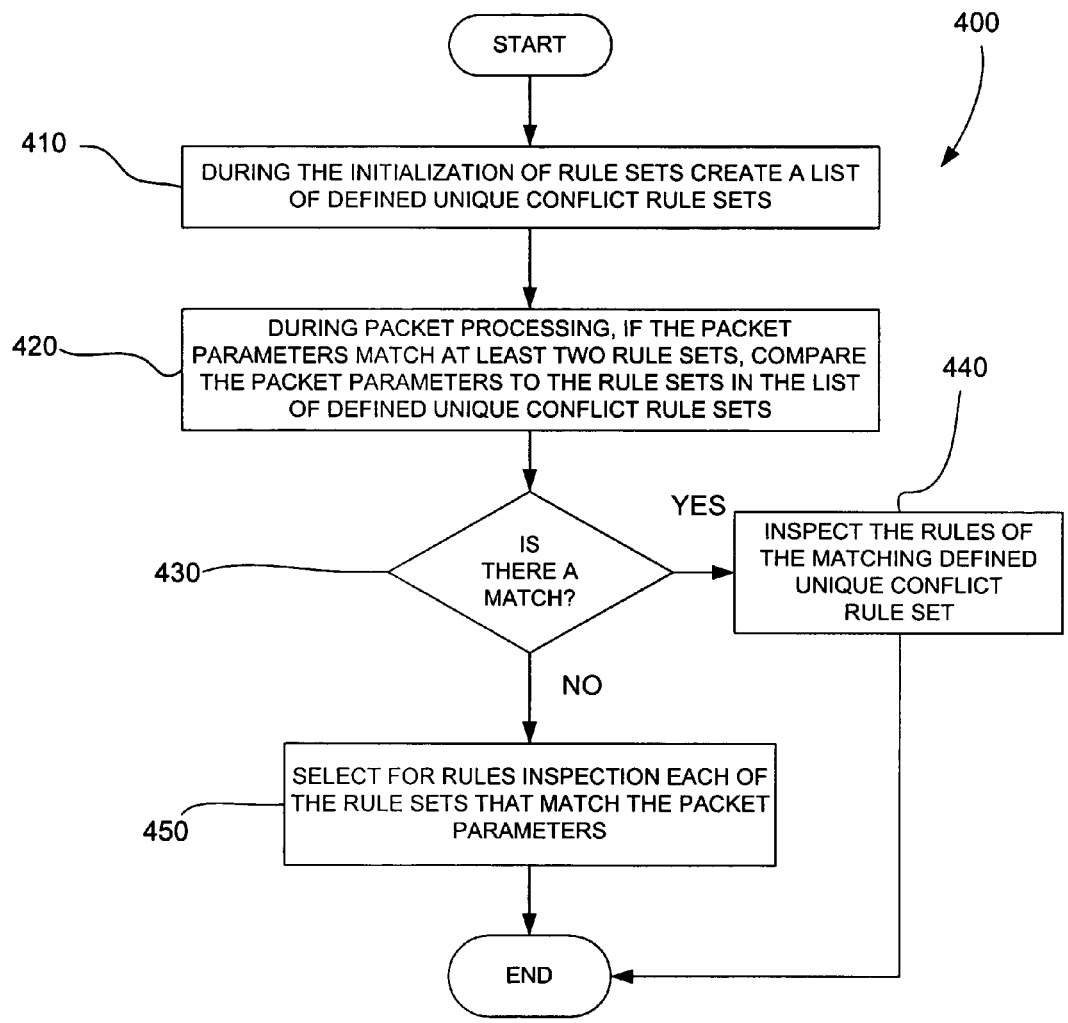
FIG. 4 is a flowchart showing a method for resolving unique conflicts between at least two rules sets that match the parameters of a packet during rule set selection in an IDS, where the undefined unique conflicts are resolved by inspecting each of the matching rule sets, in accordance with an embodiment of the present invention.

FIG. 4 is a flowchart showing a method for resolving unique conflicts between at least two rules sets that match the parameters of a packet during rule set selection in an IDS, where the undefined unique conflicts are resolved by inspecting each of the matching rule sets, in accordance with an embodiment of the present invention.

In step 410 of method 400, a list of defined unique conflict rule sets is created. This list is preferably created after the initialization of other rule sets and during the initialization of the IDS. Each unique conflict rule set is created from at least two rule sets defined by a user as rule sets capable of producing a unique conflict.

In step 420, the packet parameters of a packet whose parameters match at least two rule sets are compared to the parameters of the rule sets in the list of defined unique conflict rule sets. The comparison is done during packet processing.

In step 430, a decision is made based on whether or not there was a match.

In step 440, the rules of the matching defined unique conflict rule set are inspected if there was a match.

In step 450, the rules of each of the rule sets that originally matched the packet parameters are selected for inspection if there was no match. In one embodiment, all of the selected rule sets are always inspected. This is a multi-rule set inspection method. In another embodiment, each of the selected rule sets is inspected until an intrusion detection event is detected by matching the rule of a rule set. If such an event is found, the remaining selected rule sets are not inspected. This is a first-hit inspection method.

Figure 5:
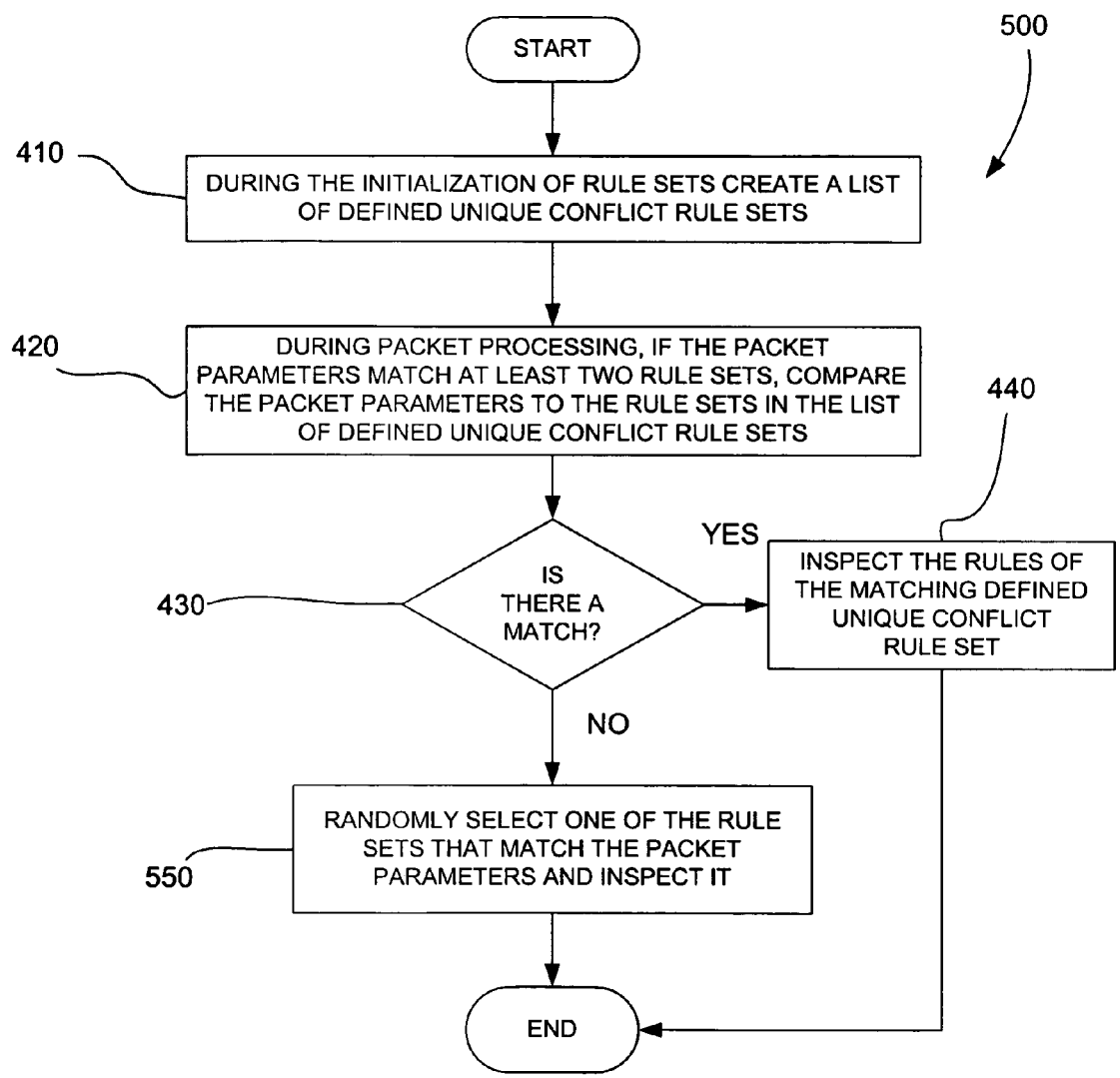
FIG. 5 is a flowchart showing a method for resolving unique conflicts between at least two rules sets that match the parameters of a packet during rule set selection in an IDS, where the undefined unique conflicts are resolved by randomly selecting one of the matching rule sets, in accordance with an embodiment of the present invention.

FIG. 5 is a flowchart showing a method for resolving unique conflicts between at least two rules sets that match the parameters of a packet during rule set selection in an IDS, where the undefined unique conflicts are resolved by randomly selecting one of the matching rule sets, in accordance with an embodiment of the present invention.

In step 410 of method 500, a list of defined unique conflict rule sets is created. This list is preferably created after the initialization of other rule sets and during the initialization of the IDS. Each unique conflict rule set is created from at least two rule sets defined by a user as rule sets capable of producing a unique conflict.

In step 420, the packet parameters of a packet whose parameters match at least two rule sets are compared to the parameters of the rule sets in the list of defined unique conflict rule sets. The comparison is done during packet processing.

In step 430, a decision is made based on whether or not there was a match.

In step 440, the rules of the matching defined unique conflict rule set are inspected if the there was a match.

In step 550, one of the rule sets that originally matched the packet parameters is randomly selected and inspected if there was no match. This is a probabilistic method.

Set-Based Rule Inspection

In a typical rules-based IDS, rules are matched against network traffic by performing a parameterized search where the parameters of the search are the rule options. A parameterized search sequentially tests each parameter. If any parameter is not accepted as valid the search has failed. The complexity and performance of such a search is generally a function of the number rules, the number of parameters of each rule, and the size of the combined address space of all of the parameters.

A set-based search differs from a rules-based parameterized search. A set-based search processes one or more parameters at a time and tests all rules in parallel. A parameterized search processes one rule at a time and tests each parameter of the current rule being tested. An efficient set-based search is, therefore, much less costly than a parameterized search.

Another embodiment of the present invention is an IDS that uses the content and uricontent fields of the rules to perform a one parameter set-based search using a multi-pattern search algorithm. These parameters are very efficient at eliminating packets and streams from further consideration. They are particularly amenable to high performance parallel inspection.

The parallel search method is generally faster than applying the sequential parameterized search test against each rule sequentially. However, this search leaves all other rule parameters untested. To use the multi-pattern search strategy it must be combined with an efficient method to test the remaining parameters, should the set-based search find a match. Since there is only one rule to test against, this can be accomplished with a standard sequential test of each parameter, as is conventionally done in IDSs.

There are four categories of rules that may need to be tested against a packet. These categories are protocol field rules, generic content rules, packet anomaly rules, and IP rules. The four categories are further divided into two search types: those with content and those without content.

The protocol field search allows a signature to specify a particular field within a protocol to search for a content match. For example, an IDS uses the 'uricontent' keyword to search HTTP request URI fields.

The generic content rules allow a signature to specify a generic search of all packet data for a string or byte sequence to match against. For example, this functionality may be used to look for any ASCII or binary strings that may trigger an event, such as 'root' or 'passwd'.

The packet anomaly rules specify characteristics of a packet or packet header that are cause for alarm. These rules have no content. Packet anomaly rules do not require any type of content search; instead, they are focused on a packet's other characteristics. While all rule types can include aspects of anomaly detection, the packet anomaly search is specific to rules not requiring any type of content search. As an example, a packet anomaly rule might look for all incoming packets from a specific IP address on a specific port, and may include other constraints on the packet's header fields.

The IP rules are applied to the IP protocol layer and may need to be tested against every IP packet. If the packet's protocol is TCP, UDP, or ICMP, these rules are processed with the corresponding application layer protocol rules. The IP rule search types may be either content or non-content.

Figure 6:
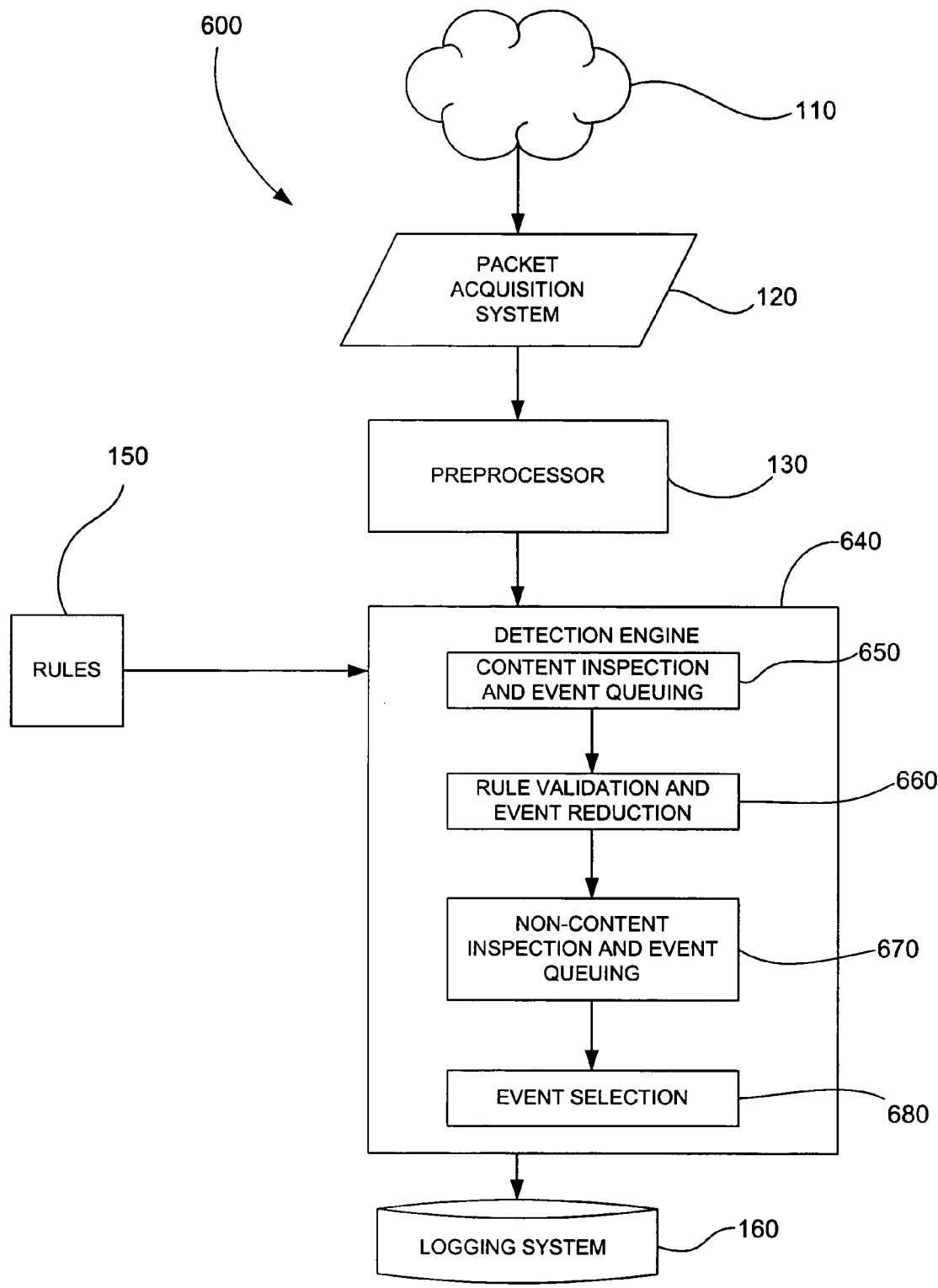
FIG. 6 is a schematic diagram showing how set-based rule inspection is implemented in an IDS in accordance with an embodiment of the present invention.

FIG. 6 is a schematic diagram showing how set-based rule inspection is implemented in an IDS, in accordance with an embodiment of the present invention. After a rule set has been selected, detection engine 640 of IDS 600 uses content inspection and event queuing component 650 to perform a multi-pattern search to find all occurrences of each search pattern. A multi-pattern search consists of collecting a group of search patterns from a rule set and conducting a simultaneous search. This type of search can inspect a body of data and find all occurrences of all patterns in the search group. Content inspection and event queuing component 650 does not abort searching on the first pattern match. Instead, each match is queued, and later processed by event selection component 680 after all packet matches are located.

Search patterns correspond to strings defined by the rule 'content' and 'uricontent' keywords. This can cause up to two separate multi-pattern searches to be performed, one for the protocol field rules, like HTTP and Telnet, and one for the Generic Content Rules. This occurs if both types of rules exist for the specific stream or packet being analyzed.

The multi-pattern search is performed as a two stage process. The first stage is content inspection and event queuing component 650. This component finds rule content occurrences in a packet, and identifies which rule the content belongs to, but does not test all of the rules' other options against the packet. If the inspection process finds a pattern match, the second stage, which takes place in rule validation and event reduction component 660, performs a complete rule inspection using the standard parameterized rule processing. This either validates the match or determines that, even though the content of the rule matched a pattern in the packet, the rules' other options failed to match the packet. The event in the event queue is then either maintained or removed, respectively.

During the first stage of the inspection process, every search pattern contained in the selected rule set is scanned for in parallel, using a set-based multi-pattern search. One embodiment of the multi-pattern search is an implementation of a modified Wu-Manber search algorithm. Another embodiment of the multi-pattern search is an implementation of an Aho-Corasick style search algorithm. Another embodiment of the multi-pattern search is an implementation of a naive set-based Boyer-Moore inspection engine. This implementation is used for processing rule sets with less than ten rules.

The Wu-Manber search algorithm is the preferred embodiment, and uses the least amount of memory. It uses hashing to create sub-groups of rules, and a set-based Bad Word Shift to accelerate the search by providing a byte skipping feature. It is a very flexible algorithm and has been used in various UNIX utilities. Due to the Bad Word Shifting feature, rule sets with a larger minimum pattern size can significantly improve this algorithm's performance. Each rule group requires about 128 K of overhead memory to manage the rule group.

The Aho-Corasick search algorithm is provided as an alternate embodiment. It uses two to three times the memory of the Wu-Manber search algorithm. This is a classic implementation of the Aho-Corasick algorithm and does not include a Boyer-Moore shift to skip characters. This algorithm is less sensitive than the Wu-Manber algorithm to small or large minimum pattern size, though a larger minimum pattern size can improve the algorithm's performance. Memory consumption is directly governed by the number of bytes used in the patterns. This algorithm has been used and adapted for database and keyword searches in which a very large number of keywords are used.

The Aho-Corasick algorithm can be slightly faster than the Wu-Manber algorithm, but does consume more memory. The naive set-based Boyer-Moore algorithm is used for small rule sets. Testing has shown that for ten rules or less this method usually performs as well or better than the other multi-pattern search algorithms. When considering performance of multi-pattern search algorithms, several issues are considered. These issues include intrinsic algorithmic performance characteristics, CPU architecture performance, the compiler and optimizations used, and application memory requirements and platform limits.

In FIG. 6, non-content rules are inspected by non-content inspection and event queuing component 670. The non-content rules are processed using a conventional IDS's parameterized search scheme. The non-content rules test the network packet header fields for anomalous values. When all of the parameters of a non-content rule match a packet, an event is queued. While this search utilizes the parameterized search strategy directly, it remains a very fast search.

Each rule match is considered an event. Since there may be several events associated with an individual packet, each event is queued until the entire packet is fully processed. The events in the queue may correspond to any of the IDS's rules. The event queue is flushed after each packet is processed and a final event is selected for logging.

Event selection component 680 sends one or more events to logging system 160 for each packet. Therefore, one or more events are selected from the event queue. The selection process includes but is not limited to the following rules. Events with the highest processing order should be chosen. Event processing orders include but are not limited to log, alert, or pass. Content events supersede anomalous events. Protocol content events, such as HTTP events, supersede generic content events. Longer content length matches, if present, supersede shorter content length matches.

Figure 7:
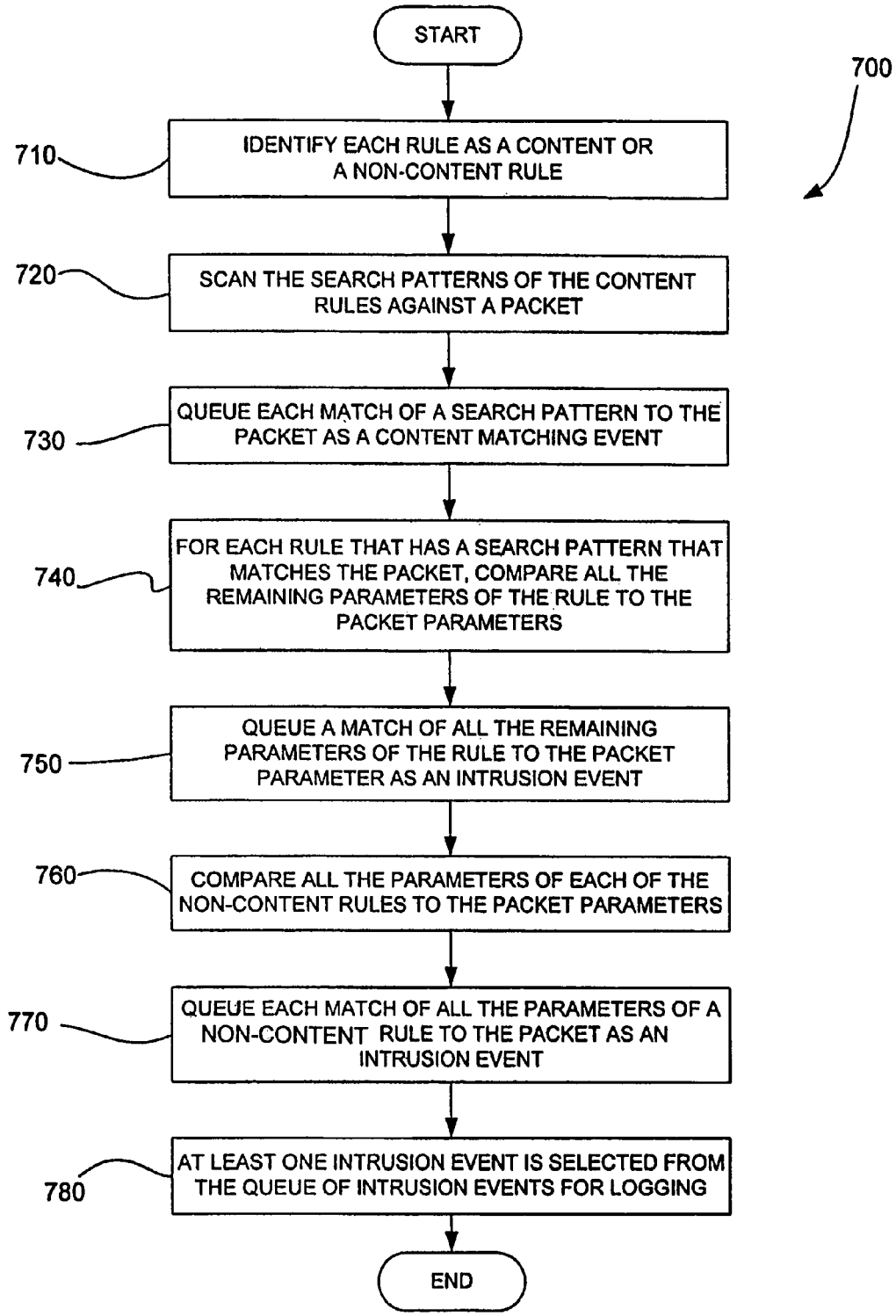
FIG. 7 is a flowchart showing a method for detecting rule matches during packet processing in an IDS in accordance with an embodiment of the present invention.

FIG. 7 is a flowchart showing a method for detecting rule matches during packet processing in an IDS, in accordance with an embodiment of the present invention.

In step 710 of method 700, each rule is identified as a content rule or a non-content rule.

In step 720, the search pattern parameter of each rule identified as a content rule is scanned against a packet. The search pattern parameter is either a string defined by a content keyword or a uricontent keyword. In another embodiment of the method, the search patterns of the all the content rules are scanned against the packet in parallel. The scanning is performed using algorithms including but not limited to a Wu-Manber search algorithm, an Aho-Corasick search algorithm, or a naive set-based Boyer-Moore search algorithm.

In step 730, each match of a search pattern to the packet is queued as a content matching event.

In step 740, the remaining parameters of each rule associated with a content matching event are compared to the rule parameters.

In step 750, a match of all the remaining parameters of the rule with the packet parameters is queued as an intrusion event.

In step 760, all the parameters of each of the non-content rules are compared to the packet parameters.

In step 770, each match of all the parameters of a non-content rule with the parameters of a packet is queued as an intrusion event.

In step 780, at least one intrusion event is selected from the queue of intrusion events for logging for each packet.

Multi-pattern searches find all occurrences of all patterns within each searched packet. This presents a natural opportunity for DOS attacks. If the detection engine triggers on all occurrences, then any repeated pattern that corresponds to an attack pattern can be used to implement a DOS attack against a naive multi-pattern matcher. It could also be a problem for any pattern matching engine that catches all rule matches.

In another embodiment of the present invention, packets are processed sequentially, looking for rule content or uri-content pattern matches. When a match is encountered, the rule is flagged and validated, and is essentially no longer used to search the current packet.

Flow Analysis

Figure 8:
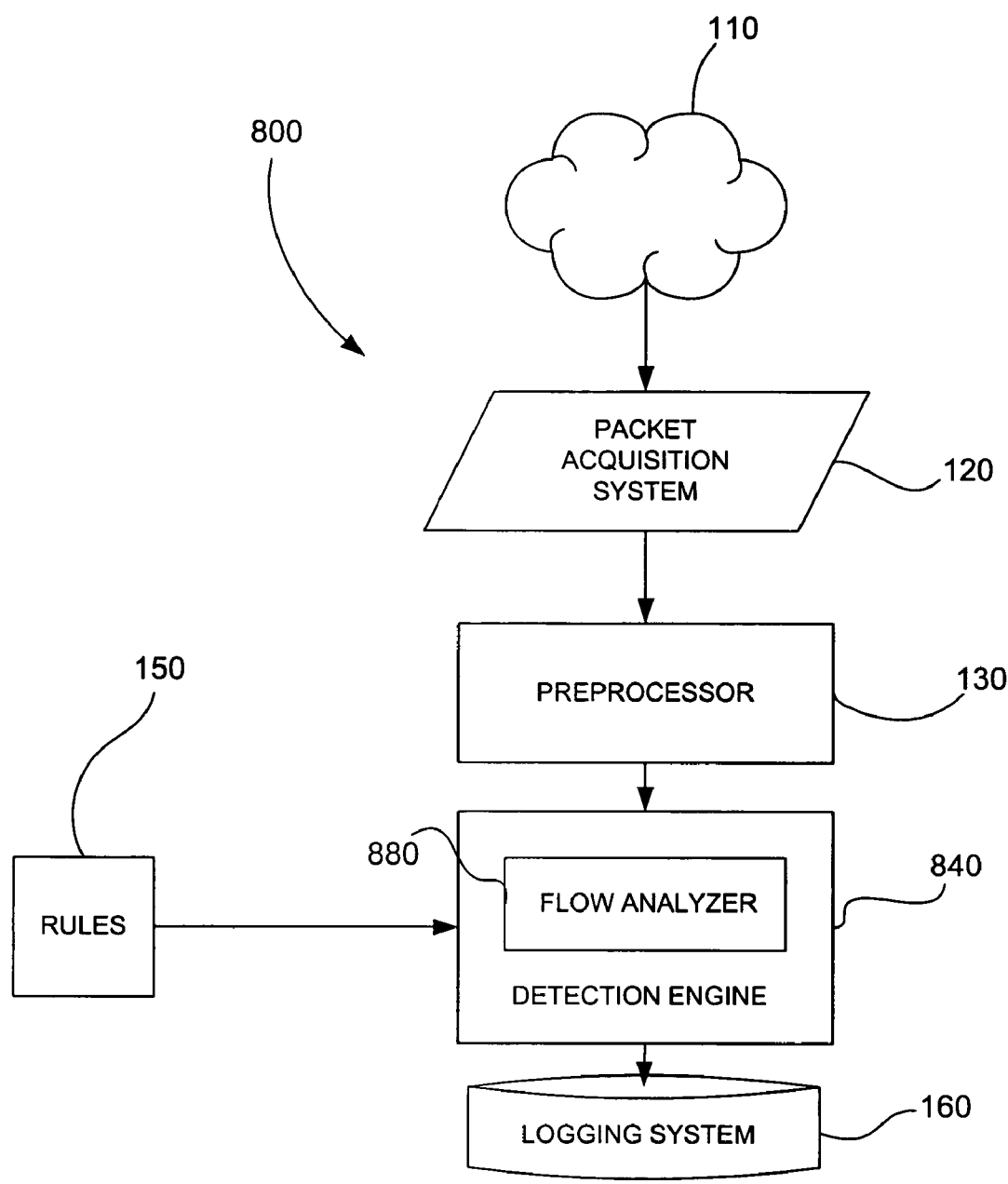
FIG. 8 is a schematic diagram showing how protocol flow analysis is implemented in an IDS in accordance with an embodiment of the present invention.

FIG. 8 is a schematic diagram showing a flow analyzer component of a detection engine that reduces the amount of network traffic analyzed by an IDS, in accordance with an embodiment of the present invention. In IDS 800, flow analyzer 880 classifies network application protocols into client and server data flows. In-depth analysis of these protocol data flows allows detection engine 840 to make intelligent decisions about protocol inspection, greatly enhances performance and efficiency, and helps to reduce false positive events. Flow analyzer 880 is also user-configurable.

A protocol flow refers to the client or server communication in an application protocol. HTTP client-to-server communication is considered a flow and HTTP server-to-client communication is considered a separate flow. This allows detection engine 840 to break down a particular application protocol into two distinct flows, a client flow and a server flow.

Protocol flow analysis is performed at a high level and is usually only concerned with a few important aspects of a particular protocol flow, such as a server response code or a client request type in the case of HTTP. Flow analysis does not replace other conventional IDS protocol inspection technologies. It complements them. It is a generic analysis component that allows an application protocol to be classified as a client or server flow. Once an application protocol is classified into a client flow or a server flow, it gives detection engine 840 useful knowledge as to the type of inspection and the regions of the protocol flow to inspect.

Flow analyzer 880 attempts to reduce the amount of network traffic analyzed by detection engine 840 at both the packet level and within the TCP stream reassembler. This technique reduces the amount of data that must be inspected for content matches.

Due to the request-response model of HTTP, typically greater than 95% of HTTP traffic for a given web transfer is the response header and data. Between 3% and 5% of HTTP traffic, which represents approximately a few hundred bytes, is the response header. Traffic from a protected server is usually trusted traffic and generally well conditioned. Detection engine 840 knows which side of a connection is the server-side based on the TCP three-way handshake. As a result, even if both source and destination ports are port 80, it is known whether a packet is from the server or client. IP fragment reassembly is transparent to flow analyzer 880, and is handled prior to flow analysis. Also, only fully reassembled IP packets are passed down to flow analyzer 880.

The purpose of an HTTP flow analyzer is to determine what part of HTTP traffic should be inspected and what part should not be inspected. This eliminates a lot of useless pattern matching. In the HTTP protocol, the client request usually consists of a few hundred bytes on average. If a detection engine has more than five hundred rules, which it applies to client-side HTTP requests, then a large number of rules are matched against a small amount of text.

However, the HTTP server response contains much more data, about 5,000 to 15,000 bytes on average. But the server response header only constitutes about three hundred bytes of the total server response. The rest of the server response is the response payload, and is generally not considered malicious traffic. This is due to the fact that servers in the protected network are trusted.

The HTTP server response flow makes up 95% of the total HTTP traffic. And the response header is typically less than 5% of the total HTTP traffic. It is this 5% that needs to be inspected. The server response payload, which is 95% or more of the server response, can be eliminated. In total, this means that only 10% (5% client-side data and 5% server-side data) of all web traffic needs to be inspected. For instance, in an enterprise network, HTTP traffic can amount to approximately 75% of all network traffic, of which only 10% of HTTP traffic needs to be processed by a detection engine. This reduces the HTTP processing from 75% of total network traffic to 30%.

The total rule processing work of an application protocol consists of both the server protocol flow and the client protocol flow. Total work is then defined as the sum of server workflow and client workflow. Using this definition, the processing time that detection engine 840 saves from protocol flow analysis can be determined. This is accomplished by finding the work flow ratio. The work flow ratio is computed by comparing the total work it takes for a detection engine to process server and client flows without using flow analysis, and the total work it takes for detection engine 840 to process server and client flows using flow analysis.

Experiments have shown that after protocol flow analysis, the work flow ratio reduces rule processing time for HTTP traffic by approximately 89%. Reducing the rule processing time by approximately 89% reduces the total processing time of a conventional rules-based IDS by 44%. This is because the rule processing time for HTTP traffic is about 50% of the total IDS processing in an average network.

Figure 9:
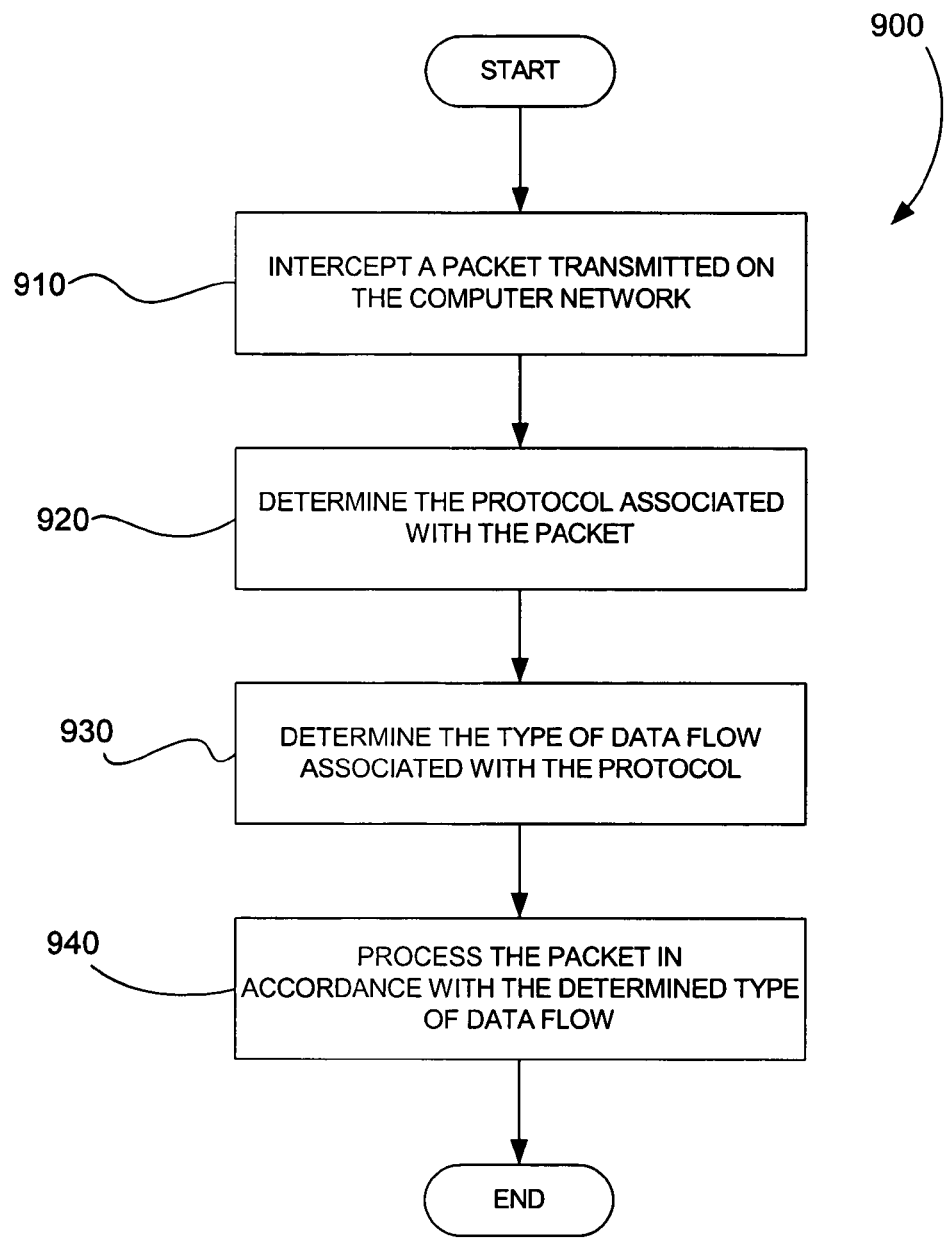
FIG. 9 is a flowchart showing a method for analyzing protocol flow in a computer network using an IDS in accordance with an embodiment of the present invention.

FIG. 9 is a flowchart showing a method for analyzing protocol flow in a computer network using an IDS, in accordance with an embodiment of the present invention.

In step 910 of method 900, a packet transmitted across the computer network is intercepted.

In step 920, the protocol associated with the packet is determined. In an embodiment of this method, the protocol associated with the packet is HTTP.

In step 930, the type of data flow associated with the protocol is determined. In an embodiment of this method, the type of data flow is either client flow or server flow.

In step 940, the packet is processed by an IDS in accordance with the determined type of data flow. In another embodiment of this method, HTTP response data traffic is not processed by the IDS.

When processing HTTP requests and responses by packet, the only processing information available is that which is available in the packet. The only required information is a user-defined variable, called HTTP Maximum Response Bytes. This variable specifies the number of HTTP response bytes to process.

Figure 10:
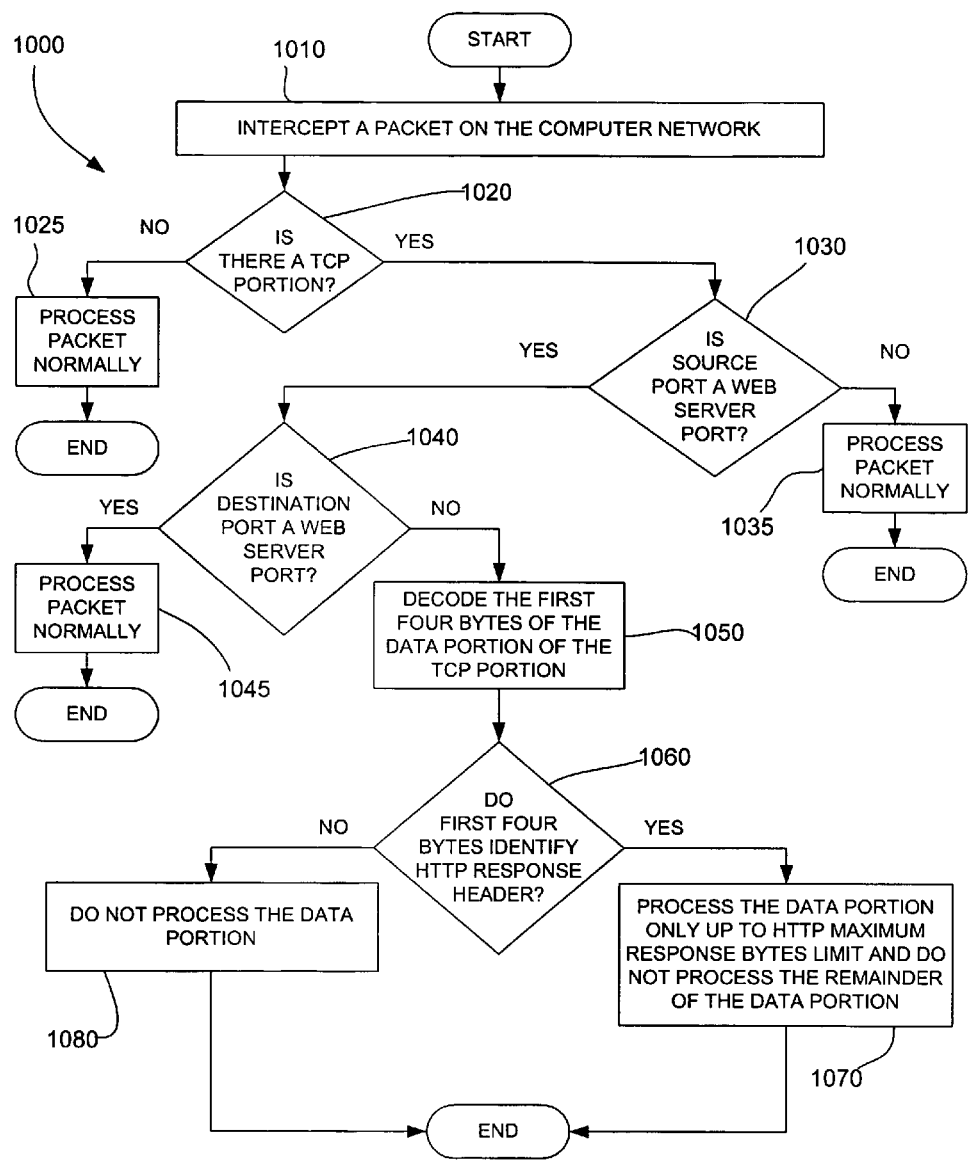
FIG. 10 is a flowchart showing a method for determining the portions of HTTP data flow in a computer network that should not be processed by an IDS in accordance with an embodiment of the present invention.

FIG. 10 is a flowchart showing a method for determining the portions of HTTP data flow in a computer network that should not be processed by an IDS, in accordance with an embodiment of the present invention.

In step 1010 of method 1000, a packet transmitted across the computer network is intercepted.

In step 1020, it is determined if the packet contains a TCP layer. A TCP layer is required for HTTP communication.

In step 1025, IDS packet processing continues normally because no TCP layer is found in the packet.

In step 1030, a TCP layer has been found. The source port in the header portion of the TCP layer is then examined to determine if the source port is a Web server port. In another embodiment of this method, the source port in the header portion of the TCP layer is then examined to determine if the source port is port 80.

In step 1035, IDS packet processing continues normally because it has been determined that the source port is not a Web server port.

In step 1040, it has been determined that the source port is a Web server port. The destination port in the header portion of the TCP layer is then examined to determine if the destination port is a Web server port. In another embodiment of this method, the destination port in the header portion of the TCP layer is then examined to determine if the destination port is port 80.

In step 1045, IDS packet processing continues normally because it has been determined that the destination port is a Web server port.

In step 1050, it has been determined that the destination port is not a Web server port. The first four bytes of the data portion of the TCP layer are then decoded.

In step 1060, it is determined if the first four bytes of the data portion of the TCP layer identify the data portion as an HTTP response header.

In step 1070, it has been determined that the first four bytes of the data portion of the TCP layer identify the data portion as an HTTP response header. The data portion of the TCP layer is then processed only up to an HTTP maximum response bytes limit. The remainder of the data portion of the TCP layer is ignored. In other words, the remainder of the data portion of the TCP layer is not processed.

In step 1080, it has been determined that the first four bytes of the data portion of the TCP layer do not identify the data portion as an HTTP response header. The entire data portion of the TCP layer is then ignored. In other words, the entire data portion of the TCP layer is not processed.

Arguably, the HTTP response header inspection could be evaded through breaking up the header from the initial HTTP response, but the flow analyzer assumes that server flows from the protected net are trusted. This embodiment has been found to be very effective for enhancing performance.

In session-based processing, HTTP requests and responses can be intelligently handled since TCP state is handled before sessions are processed. Session-based processing assumes that the client flow of a session will be rebuilt and that the server flow also will be rebuilt.

One embodiment of session-based processing is a two step process. In the first step, it is determined if there is a known HTTP session. If there is not a known HTTP session, then the payload is not processed. There is no processing because the TCP state has not been verified. In the second step, it has been determined that there is a known HTTP session. This has also been verified by the TCP state. The first four bytes of the incoming payload are then inspected for the string "HTTP." If string "HTTP" is found in this packet, a new HTTP serve response header inspection is performed. This inspection continues until the standard HTTP end-of-header delimiter (\r\n\r\n) is found.

Both packet-based and session-based processing embodiments deal with the problem of the HTTP 'Connection: Keepalive' command. In practice, the HTTP responses are fragmented at the application level and not the byte level, so new HTTP responses will begin in a new packet that begins with "HTTP." Both packet-based and session-based embodiments handle these responses without any tweak to the current procedures. However, the theoretical scenario allows multiple HTTP responses to be embedded in the same packet.

Multiple HTTP responses in a single packet will not confuse the session-based embodiments. These embodiments deal with multiple HTTP responses in a single packet by implementing a quick protocol scanner or by decoding the protocol fully. This technique is possible since it is session oriented and TCP payloads are reconstructed. In practice, multiple HTTP responses in the same packet are unlikely to occur from a trusted server.

Using HTTP flow analysis in a detection engine effectively drops about 90% of HTTP traffic from IDS inspection. In a typical 100 Mbits/s link, this eliminates approximately 87.5 Mbits/s per link, given that HTTP traffic constitutes approximately 75 Mbits/s in a 100 Mbits/s link.

Figure 11:
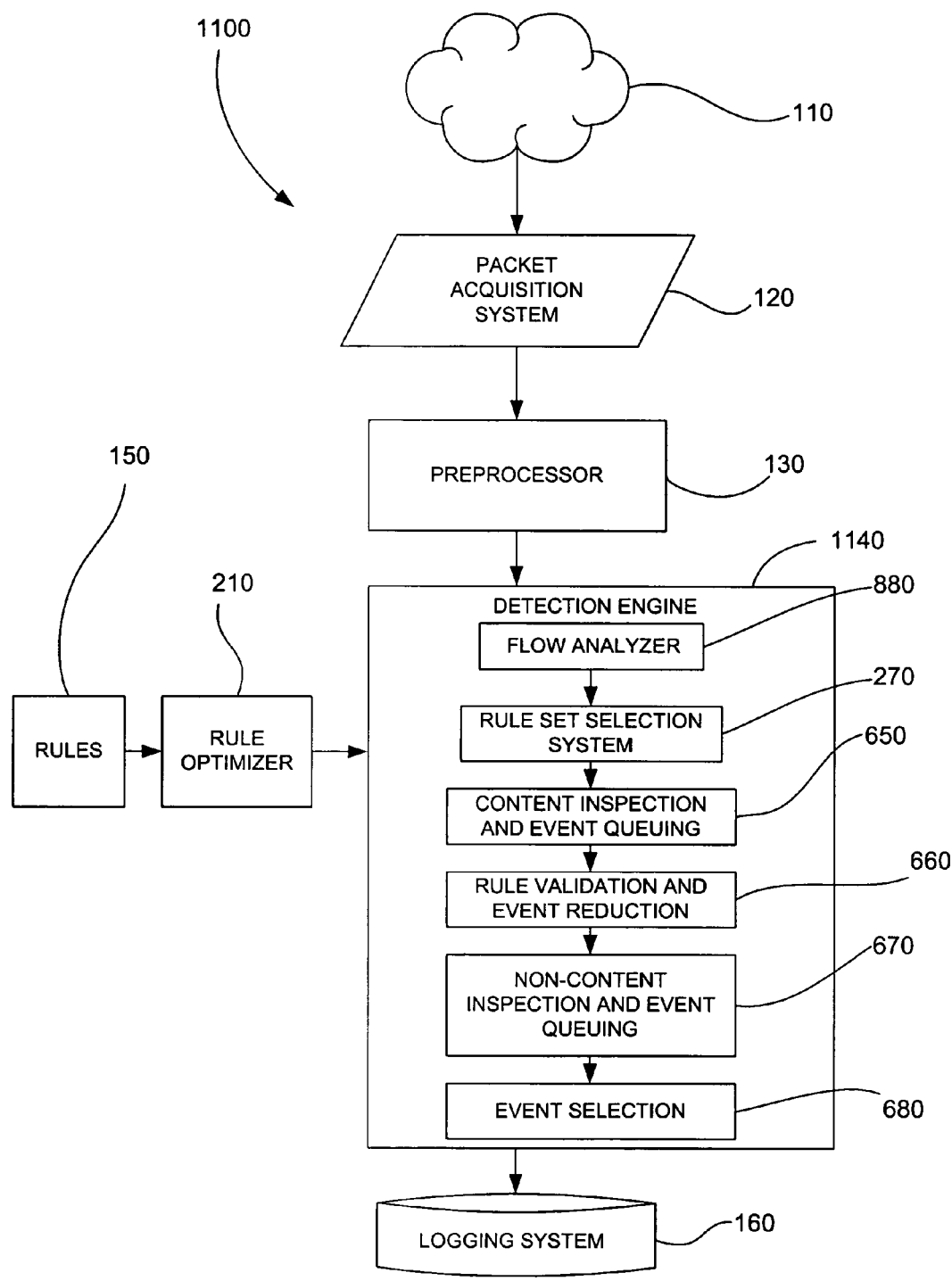
FIG. 11 is a schematic diagram showing how rule optimization, set-based rule inspection, and protocol flow analysis are implemented in an IDS, in accordance with an embodiment of the present invention.

FIG. 11 is a schematic diagram showing how rule optimization, set-based rule inspection, and protocol flow analysis are implemented in an IDS in accordance with an embodiment of the present invention. In IDS 1100, flow analyzer 880 of detection engine 1140 performs protocol flow analysis. Content inspection and event queuing component 650, rule validation and event reduction component 660, non-content inspection and event queuing component 670, and event selection component 680 of detection engine 1140 implement set-based rule inspection. Rule optimizer 210 and rule set selection system 270 of detection engine 1140 provide rule optimization.

Embodiments of the present invention relate to data communications via one or more networks. The data communications can be carried by one or more communications channels of the one or more networks. A network can include wired communication links (e.g., coaxial cable, copper wires, optical fibers, a combination thereof, and so on), wireless communication links (e.g., satellite communication links, terrestrial wireless communication links, satellite-to-terrestrial communication links, a combination thereof, and so on), or a combination thereof. A communications link can include one or more communications channels, where a communications channel carries communications. For example, a communications link can include multiplexed communications channels, such as time division multiplexing ("TDM") channels, frequency division multiplexing ("FDM") channels, code division multiplexing ("CDM") channels, wave division multiplexing ("WDM") channels, a combination thereof, and so on.

In accordance with an embodiment of the present invention, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed. The terms "instructions configured to be executed" and "instructions to be executed" are meant to encompass any instructions that are ready to be executed in their present form (e.g., machine code) by a processor, or require further manipulation (e.g., compilation, decryption, or provided with an access code, etc.) to be ready to be executed by a processor.

Systems and methods in accordance with an embodiment of the present invention disclosed herein can advantageously improve the performance of a conventional rules-based IDS. A rule optimizer improves the performance of an IDS by enhancing the efficiency of multi-rule inspection. Multi-rule inspection uses algorithms that make use of the optimized rule sets. Since all of the rules that need to be inspected are in one rule set, the inspection algorithms organize the rules so that the rules can be inspected simultaneously. This simultaneous inspection is the key to speed enhancements in multi-rule inspection. By using simultaneous inspection techniques combined with an optimal rule set, the overall inspection processing time is reduced by orders of magnitude.

A flow analyzer improves the performance of an IDS by decreasing its overall processing time and reducing the number of false positives it creates. A flow analyzer gives the detection engine rudimentary knowledge of a particular application protocol. With this knowledge, the detection engine decides what part of a protocol to inspect. This significantly reduces processing time. Flow analysis also reduces false positives by limiting the amount of inspection that the detection engine must do.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for optimizing rules in an intrusion detection system, comprising:

creating a plurality of different rule sets from a plurality of intrusion detection system rules, including combining only one or two unique rules with all generic rules for the same transport protocol to form unique rule sets, and combining all generic rules for the same transport protocol to form generic rule sets, wherein each intrusion detection system rule in the unique rule sets or generic rule sets is for a same transport protocol, wherein the only one or two unique rules specify parameters in a transport header or an IP header which are different from parameters of every other rule, wherein generic rules specify content but not parameters in a transport header or an IP header, wherein each rule set indicates a combination of parameters of the combined rules;

determining at least one rule set that matches each packet by comparing parameters but not the content of the packet to the indicated combination of parameters of the at least one rule set; and inspecting the content and parameters of the packet with only the intrusion detection system rules in the at least one rule set that matches the packet.

2. The method of claim 1, further comprising creating the plurality of rule sets during initialization of the intrusion detection system.

3. The method of claim 1, further comprising updating the plurality of rule sets while the intrusion detection system is executing when a new rule is added to the intrusion detection system.

4. The method of claim 1, further comprising selecting only one rule set for each said packet.

5. The method of claim 1, further comprising selecting two rule sets for each said packet.

6. The method of claim 1, wherein the at least one rule set includes rules for determining a protocol associated with the packet, wherein the protocol comprises HTTP;

determining a type of data flow associated with the protocol, wherein the type of data flow comprises one of client-to-server data flow and server-to-client data flow; and processing the packet in accordance with the determined type of data flow.

7. The method of claim 1, wherein the at least one rule set includes rules for determining if a transport protocol of the packet comprises a TCP portion;

determining if a source port in a header portion of the TCP portion comprises a Web server port, if the transport protocol comprises the TCP portion;

determining if a destination port of the header portion comprises a Web server port, if the source port comprises a Web server port;

decoding a data portion of the TCP portion, if the destination port does not comprise a Web server port;

determining if the data portion comprises an HTTP response header;

processing the data portion only up to an HTTP maximum response bytes limit and ignoring the remainder of the data portion, if the data portion comprises the HTTP response header; and ignoring the data portion, if the data portion does not comprise the HTTP response header.

8. The method of claim 7, wherein it is determined if the source port comprises port 80.

9. The method of claim 7, wherein it is determined if the destination port comprises port 80.

10. The method of claim 1, wherein the inspecting is with all of the intrusion detection system rules in the at least one rule set that matches the packet even after it is determined that one of the intrusion detection system rules matches the packet.

11. A method for resolving unique conflicts between at least two rule sets that match parameters of a packet during rule set selection in an intrusion detection system, comprising:

creating defined unique conflict rule sets, wherein each defined unique conflict rule set is created by combining at least two unique rule sets defined by a user as rule sets capable of having a unique conflict together with all generic rules for the same transport protocol, wherein each rule in the unique rule sets is for the same transport protocol, wherein the at least two unique rule sets specify parameters in a transport header or an IP header which are different from parameters of every other rule, wherein each unique conflict rule set indicates a combination of parameters of the combined rule sets;

comparing the parameters but not the content of the packet to the indicated combination of parameters of each defined unique conflict rule set of the defined unique conflict rule sets;

selecting for inspection a defined unique conflict rule set from the list of defined unique conflict rule sets if the parameters of the packet match the defined unique conflict rule set;

selecting for inspection each of the at least two rule sets that match parameters of the packet if the parameters of the packet do not match a defined unique conflict rule set of the defined unique conflict rule sets; and inspecting the content and parameters of the packet with only the selected rule sets.

12. The method of claim 11, wherein the defined unique conflict rule sets are created after initialization of the rule sets.

13. The method of claim 11, wherein the parameters of the packet are compared to each defined unique conflict rule set of the defined unique conflict rule sets at run time.

14. The method of claim 11, wherein the inspecting comprises inspecting each of the at least two rule sets that match parameters of the packet if the parameters of the packet do not match a defined unique conflict rule set of the defined unique conflict rule sets.

15. The method of claim 11, wherein the inspecting comprises inspecting each of the at least two rule sets that match parameters of the packet if the parameters of the packet do not match a defined unique conflict rule set of the defined unique conflict rule sets, until a rule set generates an intrusion detection event.

16. The method of claim 11, wherein the inspecting is with all of the rules in the at least one rule set that matches the packet even after it is determined that one of the rules matches the packet.

17. A method for resolving unique conflicts between at least two rule sets that match parameters of a packet during rule set selection in an intrusion detection system, comprising:

creating defined unique conflict rule sets, wherein each defined unique conflict rule set is created by combining at least two unique rule sets defined by a user as rule sets capable of having a unique conflict together with all generic rules for the same transport protocol, wherein each rule in the unique rule sets is for the same transport protocol, wherein the at least two unique rule sets specify parameters in a transport header or an IP header which are different from parameters of every other rule, wherein each unique conflict rule set indicates a combination of parameters of the combined rule sets;

comparing the parameters but not the content of the packet to the indicated combination of parameters of each defined unique conflict rule set of the defined unique conflict rule sets;

selecting for inspection a defined unique conflict rule set from the defined unique conflict rule sets if the parameters of the packet match the defined unique conflict rule set;

selecting randomly for inspection one of the at least two rule sets that matches parameters of the packet if the parameters of the packet do not match a defined unique conflict rule set of the defined unique conflict rule sets; and inspecting the content and parameters of the packet with only the selected rules.

18. The method of claim 17, wherein the inspecting is with all of the rules in the at least one rule set that matches the packet even after it is determined that one of the rules matches the packet.

19. A system for intrusion detection, the system comprising:

a packet acquisition system, wherein the packet acquisition system intercepts a packet transmitted across a computer network and wherein the packet acquisition system decodes the packet;

a preprocessor, wherein the preprocessor receives decoded packet information from the packet acquisition system and wherein the preprocessor preprocesses the packet;

a detection engine, wherein the detection engine receives preprocessed packet information from the preprocessor and wherein the detection engine inspects the packet for intrusions;

a logging system, wherein the logging system receives and stores detected intrusion information from the detection engine; and a rule optimizer, wherein the rule optimizer creates a plurality of different rule sets from a plurality of intrusion detection rules, including combining only one or two unique rules with all generic rules for the same transport protocol to form unique rule sets, and combining all generic rules for the same transport protocol to form generic rule sets, wherein each intrusion detection system rule in the unique rule sets or generic rule sets is for the same transport protocol, wherein the only one or two unique rules specify parameters in a transport header or an IP header which are different from parameters of every other rule, wherein generic rules specify packet content but not parameters in a transport header or an IP header, wherein each rule set indicates a combination of parameters of the combined rules, and the rule optimizer provides the plurality of rule sets to the detection engine, wherein, for each packet that the detection engine processes, the detection engine determines at least one rule set that matches each packet by comparing parameters but not the content of the packet to the indicated combination of parameters of the at least one rule set and inspects the content and parameters of the packet with only the intrusion detection system rules in the at least one rule set that matches each packet.

20. The system of claim 19, wherein the detection engine selects one rule set from the plurality of rule sets for inspection for each packet that the detection engine processes.

21. The system of claim 19, wherein the detection engine selects two rule sets from the plurality of rule sets for inspection for each packet that the detection engine processes.

22. The method of claim 19, wherein the inspecting is with all of the rules in the at least one rule set that matches the packet even after it is determined that one of the rules matches the packet.

23. A method for detecting rule matches during packet processing in an intrusion detection system, wherein a packet has content areas and wherein the packet header fields are non-content areas, comprising:
  identifying each rule as one of a content rule and a non-content rule, wherein a non-content rule tests packet header fields and does not inspect content, and wherein a content rule tests for a pattern match in the content area and can include rule parameters to compare to a packet;
  scanning a search pattern parameter of a rule identified as a content rule against a packet to identify a first match of the search pattern parameter and the content of the packet;
  after the scanning, if there is a first match for the packet, comparing the rule parameters of each rule that matched with packet parameters of the packet to identify a second match between the rule parameters and the packet parameters;
  if there is a second match, adding the second match to a list of intrusion events;
  comparing non-content rule parameters of each rule identified as a non-content rule with the packet parameters to identify a third match;
  if there is a third match, adding the third match of to the list of intrusion events; and
  selecting at least one intrusion event from the list of intrusion events for the packet for logging.

24. The method of claim 23, wherein the search pattern parameter comprises at least one of a string defined by rule content keyword and a string defined by a rule uricontent keyword.

25. The method of claim 23, further comprising scanning, in parallel, search pattern parameters of at least two rules identified as content rules against the packet.

26. The method of claim 25, wherein scanning search pattern parameters of at least two rules identified as content rules against the packet is performed using a Wu-Manber search algorithm.

27. The method of claim 25, wherein scanning search pattern parameters of at least two rules identified as content rules against the packet is performed using an Aho-Corasick search algorithm.

28. The method of claim 25, wherein scanning search pattern parameters of at least two rules identified as content rules against the packet is performed using a naive set-based Boyer-Moore search algorithm.

29. The method of claim 23, further comprising halting the scanning of the search pattern parameter against the packet, if the search pattern parameter has previously matched the packet.

30. A system for intrusion detection in a packet processing network, wherein a packet has content areas and wherein the packet header fields are non-content areas, the system comprising:
  a packet acquisition system, wherein the packet acquisition system intercepts a packet transmitted across a computer network and wherein the packet acquisition system decodes the packet;
  a preprocessor, wherein the preprocessor receives decoded packet information from the packet acquisition system and wherein the preprocessor preprocesses the packet;
  a detection engine, wherein the detection engine receives preprocessed packet information from the preprocessor, and wherein the detection engine:
    identifies each rule as one of a content rule and a non-content rule, wherein a non-content rule tests packet header fields and does not inspect content, wherein a content rule tests for a pattern match in the content area and can include rule parameters to compare to a packet,
    scans a search pattern parameter of a rule identified as a content rule against the packet to identify at least one first match of the search pattern parameter and the content of the packet,
    after the scanning, if there is at least one first match for the packet, compares the rule parameters of each rule that matched to packet parameters of the packet to identify a second match between the rule parameters and the packet parameters,
    if there is a second match, adds each second match to a list of intrusion events,
    compares non-content rule parameters of each rule identified as a non-content rule with the packet parameters to identify a third match,
    if there is a third match, adds each third match to the list of intrusion events, and
    selects for the packet at least one intrusion event from the list of queued intrusion events for logging; and
  a logging system, wherein the logging system receives and stores detected intrusion information from the detection engine.

31. A system for intrusion detection in a packet processing network, wherein a packet has content areas and wherein the packet header fields are non-content areas, the system comprising:
  a packet acquisition system, wherein the packet acquisition system intercepts a packet transmitted across a computer network and wherein the packet acquisition system decodes the packet;
  a preprocessor, wherein the preprocessor receives decoded packet information from the packet acquisition system and wherein the preprocessor preprocesses the packet;
  a detection engine,
    wherein the detection engine receives preprocessed packet information from the preprocessor,
    wherein the detection engine determines a protocol associated with the packet, determines a type of data flow associated with the protocol, and processes the packet in accordance with the determined type of data flow,
    wherein the detection engine:
      identifies each rule as one of a content rule and a non-content rule,
      wherein a non-content rule tests packet header fields and does not inspect content, wherein a content rule tests for a pattern match in the content area and can include rule parameters to compare to a packet,
    scans a search pattern parameter of a rule identified as a content rule against the packet to identify at least one first match of the search pattern parameter and the content of the packet,
    after the scanning, if there is at least one first match for the packet, compares the rule parameters of each rule that matched to packet parameters of the packet to identify a second match between the rule parameters and the packet parameters,
    if there is a second match, adds each second match to a list of intrusion events,
    compares non-content rule parameters of each rule identified as a non-content rule with the packet parameters to identify a third match,
    if there is a third match, adds each third match to the list of intrusion events, and
    selects for the packet at least one intrusion event from the list of queued intrusion events for logging;
a logging system, wherein the logging system receives and stores detected intrusion information from the detection engine; and
a rule optimizer, wherein the rule optimizer creates a plurality of different rule sets from a plurality of intrusion detection rules, including combining only one or two unique rules with all generic rules for the same transport protocol to form unique rule sets, and combining all generic rules for the same transport protocol to form generic rule sets, wherein each rule in the unique rule sets or generic rule sets is for the same transport protocol, wherein the only one or two unique rules specify parameters in a transport header or an IP header which are different from parameters of every other rule, wherein generic rules specify packet content but not parameters in a transport header or an IP header, wherein each rule set indicates a combination of parameters of the combined rules, and provides the plurality of rules sets to the detection engine,
wherein the detection engine selects at least one rule set from the plurality of rule sets for inspection for each packet that the detection engine processes by comparing parameters but not the content of the packet to the indicated combination of parameters of the at least one rule set,
wherein the detection engine inspects the content and parameters of the packet with only the rules in the at least one rule set that matches the packet.

* * * * *